United States Patent
Wong et al.

(10) Patent No.: US 7,962,598 B2
(45) Date of Patent: Jun. 14, 2011

(54) CONCURRENT IGRS-UPNP

(75) Inventors: Ha Yin Sandy Wong, Tiu Keng Leng (HK); Chi Kong Patrick Wu, Tsuen Wan (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 521 days.

(21) Appl. No.: 12/102,184

(22) Filed: Apr. 14, 2008

(65) Prior Publication Data
US 2009/0259742 A1  Oct. 15, 2009

(51) Int. Cl.
*G06F 15/173* (2006.01)
(52) U.S. Cl. ......... 709/223; 709/220; 709/230; 725/100
(58) Field of Classification Search .................. 709/220, 709/230, 223; 725/100
See application file for complete search history.

(56) References Cited

U.S. PATENT DOCUMENTS

| 7,206,853 | B2 | 4/2007 | Eytchison et al. | |
| 7,218,243 | B2 | 5/2007 | Hayes et al. | |
| 7,788,663 | B2 * | 8/2010 | Illowsky et al. | 717/177 |
| 2004/0111494 | A1 * | 6/2004 | Kostic et al. | 709/220 |

FOREIGN PATENT DOCUMENTS

| CN | 1353900 | 6/2002 |
| CN | 1928812 | 3/2007 |

OTHER PUBLICATIONS

Anne Gerodelle, IGRS-UPnP-DLNA Coexistence and Interoperability Concerns, Sep. 19, 2006, all pages.*
Chinese Industrial Standard SJ/T 11310, 2005, all pages.*

* cited by examiner

*Primary Examiner* — John Follansbee
*Assistant Examiner* — Glenford Madamba
(74) *Attorney, Agent, or Firm* — Ella Cheong Hong Kong; Margaret A. Burke; Sam T. Yip

(57) ABSTRACT

Systems, apparatuses and methods for processing a concurrent IGRS-UPnP architecture for both IGRS and UPnP standards conformance, and to be used for consumer electronics device interoperability.

20 Claims, 3 Drawing Sheets

CONCURRENT IGRS-UPNP

CROSS-REFERENCES TO RELATED APPLICATIONS

This application does not have any related US patent applications at the time of filing.

TECHNICAL FIELD

The presently claimed invention has applicability with consumer electronics implementations where device interoperability is desired. More specifically, the claimed invention relates to processing a concurrent IGRS-UPnP architecture for both IGRS and UPnP standards conformance.

BACKGROUND OF THE INVENTION

Consumer electronics standards often promise far more than at times are actually delivered. Often additional device standards result in a reduction in device interoperability rather than enhanced functionality. U.S. Pat. No. 7,218,243 entitled "System and method for automatically setting up a universal remote control" is one example of a system and method that describes configuring a remote control device automatically. The disclosed system and method has an aspect in common with the other references addressed in that an additional server and database is needed to upload required interface information. As a result of the external server connection, security issues and device inefficiency can arise.

U.S. Pat. No. 7,206,853 entitled "Content abstraction layer for use in home network applications" similarly defines a network architecture for a network of electronic devices including a device layer having a plurality of electronic devices interconnected using a network backbone. In the disclosed network architecture, many of the electronic devices each operate using a device native communication protocol. To control the electronic device through the defined abstraction layer, the disclosed Control Point needs to be implemented using a proprietary API.

The published Chinese patent application number 200610021946.1 details the architecture of middleware that transfers user inputted WSDL document to an IGRS service and generates source code.

The published Chinese patent number 00808405.X describes a gateway that connects devices on the UPnP network and HAVi network and translates two protocols, so devices can discover and control other different protocol devices through a dedicated gateway device.

SUMMARY OF THE INVENTION

Problems with the aforementioned references include the fact that none support concurrent IGRS and UPnP protocols. Most of the references require an external gateway to translate UPnP protocol to other protocols and concentrate on designing a Control Point in order to control devices with different protocols. According to the claimed device and related method the remote control built using the claimed invention stack can control both IGRS and UPnP devices and as a result no additional setup is required. Devices using the claimed invention can be controlled by any IGRS or UPnP standard Control Point. According to the claimed invention a defined stack provides API for developers to register their callback and transfer to service that conforms both IGRS and UPnP standards. As a result, the claimed invention enables one device to support two protocols and no external device is needed. Additionally, some of the disclosed devices need additional modification to the existing device in order to implement additional standard capability. The devices disclosed in the references need to connect to an additional server and database to upload required interface that can cause security issues as well as device inefficiency. The remote control built using the stack related to the claimed invention can control both IGRS and UPnP devices and no additional setup is required.

By circumventing the need for an external gateway, the claimed devices are able to use a single Control Point to support both IGRS and UPnP appliances. Devices with a concurrent UPnP/IGRS stack can be controlled by either IGRS or UPnP compliant Control Point and no modification is required for existing IGRS/UPnP devices. IGRS and UPnP both have the same goal in that both wish to deliver an industry standard to complete cross-industry device convergence. Both standards focus on the same consumer electronics products including intelligent appliances and mobile devices in home and corporate environments. Both standards have adopted similar distributed, open networking architecture. In addition, both have adopted the same TCP/IP, XML and HTTP standards. The primary intention is coexistence where device instructions and commands can be presented in the same network without interference.

Owing to different message formats, security technologies and protocol headers IGRS and UPnP messages often result in message conflict and device error. Under the claimed invention, a Single Control Point is used to support both IGRS and UPnP Appliances. Devices with concurrent UPnP/IGRS stack can be controlled by either IGRS or UPnP compliant Control Point with no modification is required for existing IGRS/UPnP devices and no external gateway is required.

Table 2 gives an overall comparison of IGRS and UPnP protocols

TABLE 2

| | IGRS | UPnP |
|---|---|---|
| Transport and Network Protocol | TCP/IP (IPv4)<br>HTTP 1.1 | TCP/IP (IPv4/IPv6)<br>HTTP 1.0/1.1 |
| Discovery | Adopts SSDP<br>Package Length: verbose<br>Discovery multicast through address: 239.255.255.250:1900<br>Response unicast through port 3880<br>Support Device Group Search<br>Support Device/Service Search through Proxy | Adopts SSDP<br>Package length: short<br>Discovery multicast through address: 239.255.255.250:1900<br>Response unicast through the IP add/port the request message come from |
| Advertisement | Adopts SSDP & GENA<br>Multicast address: 239.255.255.250:1900<br>Support online/offline eventing<br>Notify service online/offline status to group master device | Adopts SSDP & GENA<br>Multicast address: 239.255.255.250:1900<br>Send out 3 + 2d + k advertisements each time |
| Description | Retrieve description document from secure pipe or non-secure URL<br>Device description conform to IGRS device description template<br>Service description base on WSDL1.1 with extension of IGRS portType | Retrieve description document from service SCPD URL<br>Description document base on UPnP description document standard |
| Service Control | Control through service session<br>Base on SOAP standard | Control through service control URL<br>Base on SOAP standard<br>Use GENA for service eventing |
| Security | Incorporate in to the underlying message structure<br>Support secure pipe and secure session | Defined Device Security and Security Console profile |

Online Notification
When a device joins the network, it advertises the availability of itself and all services that it provides. This lets control points know about all of the device functionality and all of the various ways the device can be found. The notification is multicasted through the network

TABLE 3

IGRS Online Notification Message

| Header | Required | Type | Description |
|---|---|---|---|
| Host | Required | Multicast address and host | Must be 239:255:255:250:1900 |
| Cache-Control | Required | Must have max-age directive | Specifies the number of seconds that the advertisement is valid. Should be larger than 3 seconds |
| Location | Required | Single URL | This URL points to the location of the IGRS device description document if device supports non-secure pipe. Otherwise the value should be http://www.igrs.org/device |
| NT | Required | Notification Type | May take one of the following forms: uuid:deviceURN serviceTypeURN |
| NTS | Required | Single URI | Must be ssdp:alive |
| Server | Required | String | Concatenation of OS name, OS version, IGRS/1.0, product name, and product version |
| USN | Required | Single URI | May take one of the following forms: uuid:deviceURN uuid:deviceURN::serviceTypeURN |
| Man | Required | String | Must be "http://www.igrs.org/spec1.0";ns=01 |
| 01-IGRS Version | Required | String | Must be IGRS/1.0 |
| 01-IGRSMessageType | Required | String | Must be one of the following values: DeviceOnlineAdvertisement ServiceOnlineAdvertisement |
| 01-SourceDeviceId | Required | Single URI | Device URN |
| 01-DeviceType | Required if it is IGRS device online message | Single URI | Device Type URN |
| 01-DeviceName | Required if it is IGRS device online message | String | Device name |
| 01-ServiceName | Required if it is IGRS service online message | String | Service name |
| 01-ServiceType | Required if it is IGRS service online message | Single URI | Service Type URN |
| 01-ServiceId | Required if it is IGRS service online message | 32 bit unsigned integer (0 reserved) | Service Id |
| 01-ConfigId | Required if it is IGRS device online message | 32 bit unsigned integer (0 reserved) | The value shall be increased by 1 whenever there is a configuration change. And the value will return to 1 when upper limit is reached. |

TABLE 3-continued

IGRS Online Notification Message

| Header | Required | Type | Description |
|---|---|---|---|
| 01-BootId | Required if it is IGRS device online message | 32 bit unsigned integer (0 reserved) | The value shall be increased by 1 when the device is rebooted. And the value will return to 1 when upper limit is reached. |
| 01-DeviceGroupIdList | Required if it is IGRS device online message | String | Device group ID list, spaced by ";". |
| 01-DeviceSecurityId List | Required if it is IGRS device online message | String | Device Security ID list, spaced by ";". |
| 01-ServiceSecurityId List | Required if it is IGRS service online message | String | Service Security ID list, spaced by ";". |
| 01-SecureListenerList | Optional | String | Secure listener list, format of each listener is "IP address:port" and spaced by ";" in the list string. |
| 01-ListenerList | Required | String | Listener list, format of each listener is "IP address:port" and spaced by ";" in the list string. |

TABLE 4

UPnP Online Notification Message

| Header | Required | Type | Description |
|---|---|---|---|
| Host | Required | Multicast address and host | Must be 239.255.255.250:1900 |
| Cache-Control | Required | Must have max-age directive | Specifies the number of seconds that the advertisement is valid. Should be larger than 1800 seconds |
| Location | Required | Single URL | This URL points to the location of the UPnP device description document of the root device. |
| NT | Required | Notification Type | May take one of the following forms: upnp:rootdevice uuid:deviceURN deviceTypeURN serviceTypeURN |
| NTS | Required | Single URI | Must be ssdp:alive |
| Server | Required | String | Concatenation of OS name, OS version, UPnP/1.0, product name, and product version |
| USN | Required | Single URI | May take one of the following forms: uuid:deviceURN::upnp:rootdevice uuid:deviceURN uuid:deviceURN::deviceTypeURN uuid:deviceURN::serviceTypeURN |

TABLE 5

Concurrent IGRS-UPnP Online Notification Message

| Header | Required | Type | Description |
|---|---|---|---|
| Host | Required | Multicast address and host | Must be 239:255:255.250:1900 |
| Cache-Control | Required | Must have max-age directive | Specifies the number of seconds that the advertisement is valid. Should be larger than 1800 seconds |

TABLE 5-continued

Concurrent IGRS-UPnP Online Notification Message

| Header | Required | Type | Description |
| --- | --- | --- | --- |
| Location | Required | Single URL | This URL points to the location of the Concurrent IGRS-UPnP device description document if device supports non-secure pipe. |
| NT | Required | Notification Type | May take one of the following forms: upnp:rootdevice uuid:deviceURN deviceTypeURN serviceTypeURN |
| NTS | Required | Single URI | Must be ssdp:alive |
| Server | Required | String | Concatenation of OS name, OS version, protocol/1.0, product name, and product version |
| USN | Required | Single URI | May take one of the following forms: uuid:deviceURN::upnp:rootdevice uuid:deviceURN uuid:deviceURN::deviceTypeURN uuid:device-URN::serviceTypeURN |
| Man | Required | String | Must be "http://www.igrs.org/spec1.0";ns=01 |
| 01-IGRSVersion | Required | String | Must be IGRS/1.0 |
| 01-IGRSMessageType | Required | String | Must be one of the following values: DeviceOnlineAdvertisement ServiceOnlineAdvertisement |
| 01-SourceDeviceId | Required | Single URI | Device URN |
| 01-DeviceType | Required if it is IGRS device online message | Single URI | Device Type URN |
| 01-DeviceName | Required if it is IGRS device online message | String | Device name |
| 01-ServiceName | Required if it is IGRS service online message | String | Service name |
| 01-ServiceType | Required if it is IGRS service online message | Single URI | Service Type URN |
| 01-ServiceId | Required if it is IGRS service online message | 32 bit unsigned integer (0 reserved) | Service identifier |
| 01-ConfigId | Required if it is IGRS device online message | 32 bit unsigned integer (0 reserved) | The value shall be increased by 1 whenever there is a configuration change. And the value will return to 1 when upper limit is reached. |
| 01-BootId | Required if it is IGRS device online message | 32 bit unsigned integer (0 reserved) | The value shall be increased by 1 when the device is rebooted. And the value will return to 1 when upper limit is reached. |

TABLE 5-continued

Concurrent IGRS-UPnP Online Notification Message

| Header | Required | Type | Description |
| --- | --- | --- | --- |
| 01-DeviceGroupIdList | Required if it is IGRS device online message | String | Device group ID list, spaced by ";". |
| 01-DeviceSecurityIdList | Required if it is IGRS device online message | String | Device Security ID list, spaced by ";". |
| 01-ServiceSecurityIdList | Required if it is IGRS service online message | String | Service Security ID list, spaced by ";". |
| 01-SecureListenerList | Optional | String | Secure listener list, format of each listener is "IP address:port" and spaced by ";" in the list string. |
| 01-ListenerList | Required | String | Listener list, format of each listener is "IP address:port" and spaced by ";" in the list string. |

Offline Notification: When a device is removed from the network, it notifies control points that it is going away by sending Offline Notification message corresponding to each of the Online Notification it has previously sent out. This notifies the control points that the device and its services are no longer available. The notification is multicasted through the network.

TABLE 6

IGRS Offline Notification Message

| Header | Required | Type | Description |
| --- | --- | --- | --- |
| Host | Required | Multicast address and host | Must be 239.255.255.250:1900 |
| NT | Required | Notification Type | Same as NT header value in corresponding online notification message. |
| NTS | Required | Single URI | Must be ssdp:bye-bye |
| USN | Required | Single URI | Same as USN header value in corresponding online notification message |
| Man | Required | String | Must be "http://www.igrs.org/spec1.0";ns=01 |
| 01-IGRSVersion | Required | String | Must be IGRS/1.0 |
| 01-IGRSMessageType | Required | String | Must be one of the following values: DeviceOfflineAdvertisement ServiceOfflineAdvertisement |
| 01-SourceDeviceId | Required | Single URI | Same as 01-SourceDeviceId header value in corresponding online notification message |
| 01-ServiceId | Required if it is IGRS service offline message | 32 bit unsigned integer (0 reserved) | Same as 01-ServiceId header value in corresponding online notification message |

TABLE 7

UPnP Offline Notification Message

| Header | Required | Type | Description |
|---|---|---|---|
| Host | Required | Multicast address and host | Must be 239.255.255.250:1900 |
| NT | Required | Notification Type | Same as NT header value in corresponding online notification message. |

TABLE 7-continued

UPnP Offline Notification Message

| Header | Required | Type | Description |
|---|---|---|---|
| NTS | Required | Single URI | Must be ssdp:bye-bye |
| USN | Required | Single URI | Same as USN header value in corresponding online notification message |

TABLE 8

Concurrent IGRS-UPnP Offline Notification Message

| Header | Required | Type | Description |
|---|---|---|---|
| Host | Required | Multicast address and host | Must be 239.255.255.250:1900 |
| NT | Required | Notification Type | Same as NT header value in corresponding online notification message. |
| NTS | Required | Single URI | Must be ssdp:bye-bye |
| USN | Required | Single URI | Same as USN header value in corresponding online notification message |
| Man | Required | String | Must be "http://www.igrs.org/spec1.0";ns=01 |
| 01-IGRSVersion | Required | String | Must be IGRS/1.0 |
| 01-IGRSMessageType | Required | String | Must be one of the following values: DeviceOfflineAdvertisement ServiceOfflineAdvertisement |
| 01-SourceDeviceId | Required | Single URI | Same as 01-SourceDeviceId header value in corresponding online notification message |
| 01-ServiceId | Required if it is IGRS service offline message | 32 bit unsigned integer (0 reserved) | Same as 01-ServiceId header value in corresponding online notification message |

Discovery occurs when Control Point sends out the discovery message to search for devices and services on the network and find ones that meet its search criteria.

TABLE 9

IGRS Discovery Request Message:

| Header | Required | Type | Description |
|---|---|---|---|
| Host | Required | Multicast address and host | Must be 239.255.255.250:1900 |
| Man | Required | String | Must be ssdp:discover |
| MX | Required | Integer | Maximum number of seconds in which to respond. The maximum value is 120 seconds |
| ST | Required | Single URI | Must be one of values: urn:schemas-IGRS-org:device:IGRSdevice:1 urn:schemas-IGRS-org:service:IGRSservice:1 |
| Man | Required | String | Must be "http://www.igrs.org/spec1.0";ns=01 |
| 01-IGRSVersion | Required | String | Must be IGRS/1.0 |
| 01-IGRSMessageType | Required | String | Must be one of following values: SearchDeviceRequest SearchServiceRequest |

TABLE 9-continued

IGRS Discovery Request Message:

| Header | Required | Type | Description |
| --- | --- | --- | --- |
| 01-SourceDeviceId | Required | Single URI | Device URN |
| 01-SequenceId | Required | 32 bit unsigned integer (0 reserved) | Sequence Id of search request message |
| 01-ClientId | Required | 32 bit unsigned integer (0 reserved) | Client ID |
| 01-SearchAll | Optional | String | Must be TRUE |
| 01-SearchByDeviceName | Optional | String | Device Name |
| 01-SearchByDeviceType | Optional | Single URI | Device Type URN |
| 01-SearchByDeviceId | Optional | Single URI | Device URN |
| 01-SearchByDeviceGroupId | Optional | Single URI | Device Group URN |
| 01-SearchByServiceType | Optional | Single URI | Service Type URN |
| 01-SearchByServiceName | Optional | String | Service Name |

TABLE 10

UPnP Discovery Request Message:

| Header | Required | Type | Description |
| --- | --- | --- | --- |
| Host | Required | Multicast address and host | Must be 239.255.255.250:1900 |
| Man | Required | String | Must be ssdp:discover |
| MX | Required | Integer | Maximum number of seconds in which to respond. |
| ST | Required | Single URI | May take one of the following forms: ssdp:all upnp:rootdevice uuid:deviceURN deviceTypeURN serviceTypeURN |

TABLE 11

Concurrent IGRS-UPnP Discovery Request Message:

| Header | Required | Type | Description |
| --- | --- | --- | --- |
| Host | Required | Multicast address and host | Must be 239.255.255.250:1900 |
| Man | Required | String | Must be ssdp:discover |
| MX | Required | Integer | Maximum number of seconds in which to respond. The maximum value is 120 seconds |
| ST | Required | Single URI | Value must take form: ssdp:all upnp:rootdevice uuid:deviceURN deviceTypeURN serviceTypeURN urn:schemas-IGRS-org:device:IGRSdevice:1 urn:schemas-IGRS-org:service:IGRSservice:1 |
| Man | Required | String | Must be "http://www.igrs.org/spec1.0";ns=01 |
| 01-IGRSVersion | Required | String | Must be IGRS/1.0 |
| 01-IGRSMessageType | Required | String | Must be one of following values: SearchDeviceRequest SearchServiceRequest |

TABLE 11-continued

Concurrent IGRS-UPnP Discovery Request Message:

| Header | Required | Type | Description |
| --- | --- | --- | --- |
| 01-SourceDeviceId | Required | Single URI | Device URN |
| 01-SequenceId | Required | 32 bit unsigned integer (0 reserved) | Sequence Id of search request message |
| 01-ClientId | Required | 32 bit unsigned integer (0 reserved) | Client ID |
| 01-SearchAll | Optional | String | Must be TRUE |
| 01-SearchByDeviceName | Optional | String | Device Name |
| 01-SearchByDeviceType | Optional | Single URI | Device Type URN |
| 01-SearchByDeviceId | Optional | Single URI | Device URN |
| 01-SearchByDeviceGroupId | Optional | Single URI | Device Group URN |
| 01-SearchByServiceType | Optional | Single URI | Service Type URN |
| 01-SearchByServiceName | Optional | String | Service Name |

TABLE 12

IGRS Discovery Response Message:

| Header | Required | Type | Description |
| --- | --- | --- | --- |
| Cache-Control | Required | Must have max-age directive | Specifies the number of seconds that the advertisement is valid. Should be larger than 3 seconds |
| Ext | Required | No value | |
| Location | Required | Single URL | This URL points to the location of the IGRS device description document if device supports non-secure pipe. Otherwise the value should be http://www.igrs.org/device |
| Server | Required | String | Concatenation of OS name, OS version, IGRS/1.0, product name, and product version |
| ST | Required | Single URI | Same as ST header value in corresponding request message |
| USN | Required | Single URI | May take one of the following forms: uuid:deviceURN::DeviceTypeURN uuid:deviceURN::ServiceTypeURN |
| Man | Required | String | Must be "http://www.igrs.org/spec1.0";ns=01 |
| 01-IGRSVersion | Required | String | Must be IGRS/1.0 |
| 01-IGRSMessageType | Required | String | Must be one of following values: SearchDeviceResponse SearchServiceResponse |
| 01-SourceDeviceId | Required | Single URI | Source Device URN |
| 01-TargetDeviceId | Required | Single URI | Target Device URN |
| 01-SecureListenerList | Optional | String | Secure listener list, format of each listener is "IP address:port" and spaced by ";" in the list string. |
| 01-ListenerList | Required | String | Listener list, format of each listener is "IP address:port" and spaced by ";" in the list string. |
| 01-DeviceSecurityIdList | Required | String | Device security id list, spaced by ";" in the list string |

TABLE 13

| Header | Required | Type | Description |
|---|---|---|---|
| UPnP Discovery Response Message: | | | |
| Cache-Control | Required | Must have max-age directive | Specifies the number of seconds that the advertisement is valid. Should be larger than 1800 seconds |
| Date | Required | RFC 1123 date | When the response was generated |
| Ext | Required | No value | |
| Location | Required | Single URL | This URL points to the location of the UPnP device description document of the root device. |
| Server | Required | String | Concatenation of OS name, OS version, UPnP/1.0, product name, and product version |
| ST | Required | Single URI | Same as ST header value in corresponding request message |
| USN | Required | Single URI | May take one of the following forms: uuid:deviceURN:upnp-rootdevice uuid:deviceURN uuid:deviceURN::deviceTypeURN uuid:deviceURN::serviceTypeURN |
| Concurrent IGRS-UPnP Discovery Response Message: | | | |
| Cache-Control | Required | Must have max-age directive | Specifies the number of seconds that the advertisement is valid. Should be larger than 1800 seconds |
| Ext | Required | No value | |
| Location | Required | Single URL | This URL points to the location of the Concurrent IGRS-UPnP device description document if device supports non-secure pipe. |
| Server | Required | String | Concatenation of OS name, OS version, protocol/1.0, product name, and product version |
| ST | Required | Single URI | Same as ST header value in corresponding request message |
| USN | Required | Single URI | May take one of the following forms: uuid:deviceURN:upnp-rootdevice uuid:deviceURN uuid:deviceURN::deviceTypeURN uuid:deviceURN::serviceTypeURN |
| Man | Required | String | Must be "http://www.igrs.org/spec1.0";ns=01 |
| 01-IGRSVersion | Required | String | Must be IGRS/1.0 |
| 01-IGRSMessageType | Required | String | Must be one of following values: SearchDeviceResponse SearchServiceResponse |
| 01-SourceDeviceId | Required | Single URI | Source Device URN |
| 01-TargetDeviceId | Required | Single URI | Target Device URN |
| 01-SecureListenerList | Optional | String | Secure listener list, format of each listener is "IP address:port" and spaced by ";" in the list string. |
| 01-ListenerList | Required | String | Listener list, format of each listener is "IP address:port" and spaced by ";" in the list string. |
| 01-DeviceSecurityIdList | Required | String | Device security id list, spaced by ";" in the list string |

By implementing the disclosed concurrent UPnP-IGRS stack, network traffic is reduced as a result of message merging and reduced memory usage is attained through module reuse. As a direct and intended consequence, support is not needed from the respective standards bodies since the stack is completely standard compliant.

DESCRIPTION OF THE PREFERRED EMBODIMENT

Figures 1, 2:
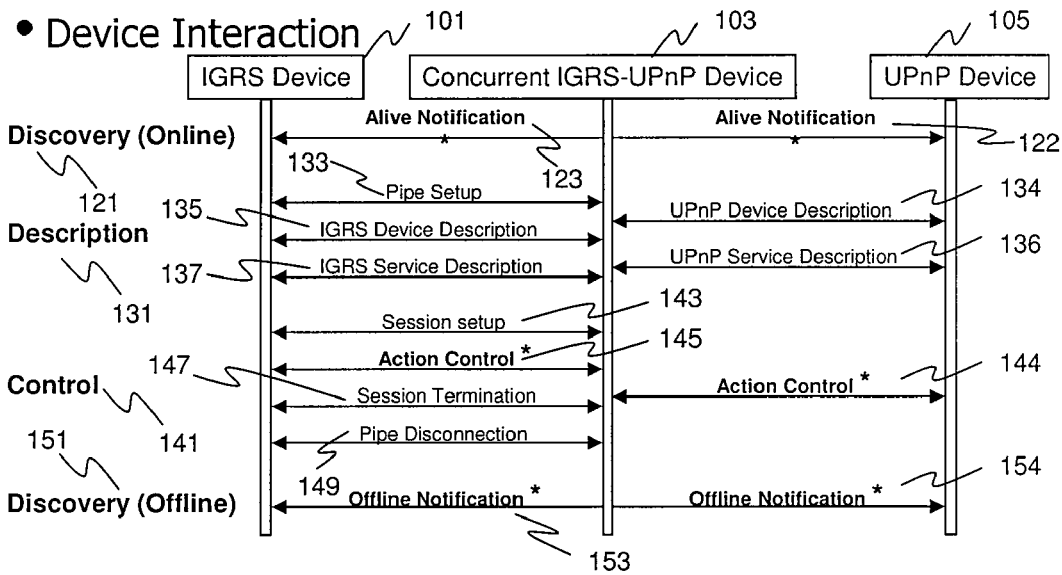
FIG. 1 depicts a block diagram of the primary embodiment of the claimed invention.
FIG. 2 depicts a block diagram of the architecture of the primary embodiment of the claimed invention as applied to IGRS, UPnP and Concurrent IGRS-UPnP Devices.

FIG. 1 depicts a block diagram of the primary embodiment of the claimed invention. According to FIG. 1, device 101, 103, 105 interaction is governed by four phases of operation starting with discovery (Online) 121, description 131, control 141 and discovery (Offline) 151. With the IGRS and Concurrent IGRS-UPnP Device, discovery (Online) 121 begins with Alive Notification 123 in which the device notifies other devices on the network that the device is active. After Alive Notification, the description phase 131 is entered where pipe setup 133 is followed by IGRS Device Description 135 and IGRS Service Description 137. After the description phase 131 is complete, control phase 141 begins with session setup 143, action control 145, session termination 147 and pipe disconnection 19. Discovery (offline) 151 concludes with offline notification 153. According to one embodiment of the claimed invention, the Concurrent IGRS-UPnP Devices is a control point and controls the actions of IGRS devices in the network through action control 145.

FIG. 1 additionally depicts a block diagram of the primary embodiment of the claimed invention as applied to UPnP and Concurrent IGRS-UPnP Devices. With UPnP capable devices, device 101, 103, 105 interaction is similarly governed by four phases of operation starting with discovery (Online) 121, description 131, control 141 and discovery (Offline) 151. With the UPnP and Concurrent IGRS-UPnP Devices, discovery (Online) 121 begins with Alive Notification 122 in which the device notifies other devices on the network that the device is active. After Alive Notification, the description phase 131 is entered where UPnP device description 134 is followed by UPnP Service Description 136. After the description phase 131 is complete, control phase 141 begins with action control 144. Discovery (offline) 151 concludes with offline notification 154. According to one embodiment of the claimed invention, the Concurrent IGRS-UPnP Devices is a control point and controls the actions of UPnP devices in the network through action control 144. According to another embodiment of the claimed invention, the Concurrent IGRS-UPnP Devices acts as a control point and controls the actions of IGRS devices and UPnP devices in the network through action control 145 and action control 144 respectively.

FIG. 2 depicts a block diagram of the architecture of the primary embodiment of the claimed invention as applied to IGRS, UPnP and Concurrent IGRS-UPnP Devices. FIG. 2 architecture summary 201 details port layer 210 with first port 211 connected to mini-server 214 and second port 221 connected to multicast listener 224. Application (or API) layer 220 including mini-server 214 and multicast listener 224 also includes HTTP sender 228. Under application layer 220 is the profile handler session layer 230 where UPnP Profile Handler 231 and IGRS Profile Handler 233 support mini-server 214, multicast listener 224 and HTTP sender 228. Below profile handler session layer 230 is device handler session layer 240. Device handler session layer 240 includes Advertisement Handler 242, Event Handler 244, Description Handler 246, Discovery Handler 247 and IGRS Pipe/Session Manager 248. Transport layer 250 includes Core Library 252 which handles protocols such as HTTP, XML, SSDP, GENA, SOAP, WSDL and Security. Architecture summary 201 also depicts Abstract Layer 260 and Hardware Platform layer 270.

Figure 3:
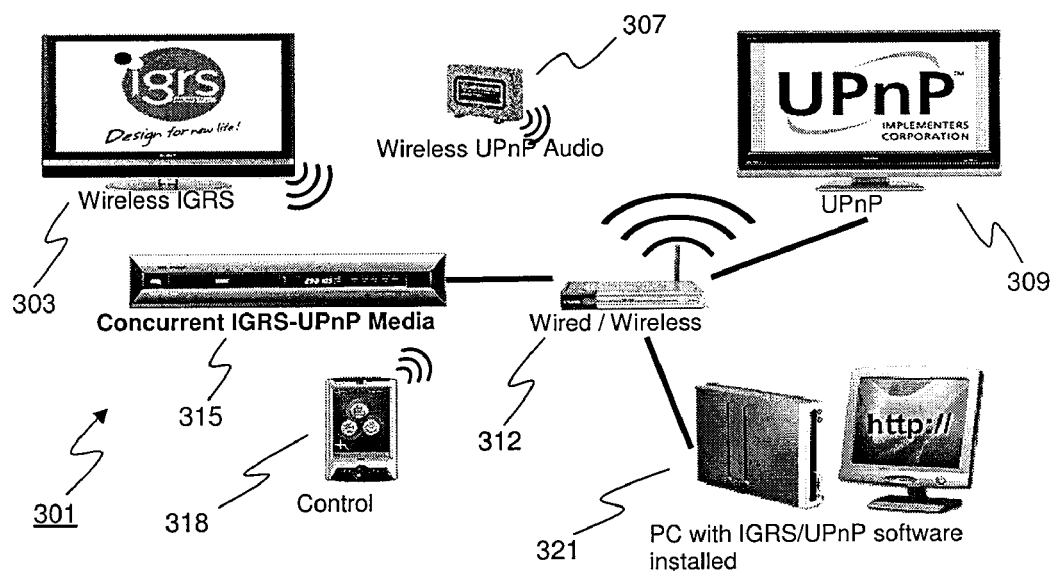
FIG. 3 depicts a schematic diagram of electronic devices in operation according to the claimed invention.

FIG. 3 depicts a schematic diagram of electronic devices in operation according to the claimed invention. Device community 301 includes wireless IGRS display 303, wireless UPnP audio content device 307, UPnP display 309, wired and wireless gateway 312 connected to concurrent IGRS-UPnP media player 315, control point 318 and PC 321 with IGRS and UPnP software installed to allow for joint IGRS and UPnP control capabilities.

Figure 4:
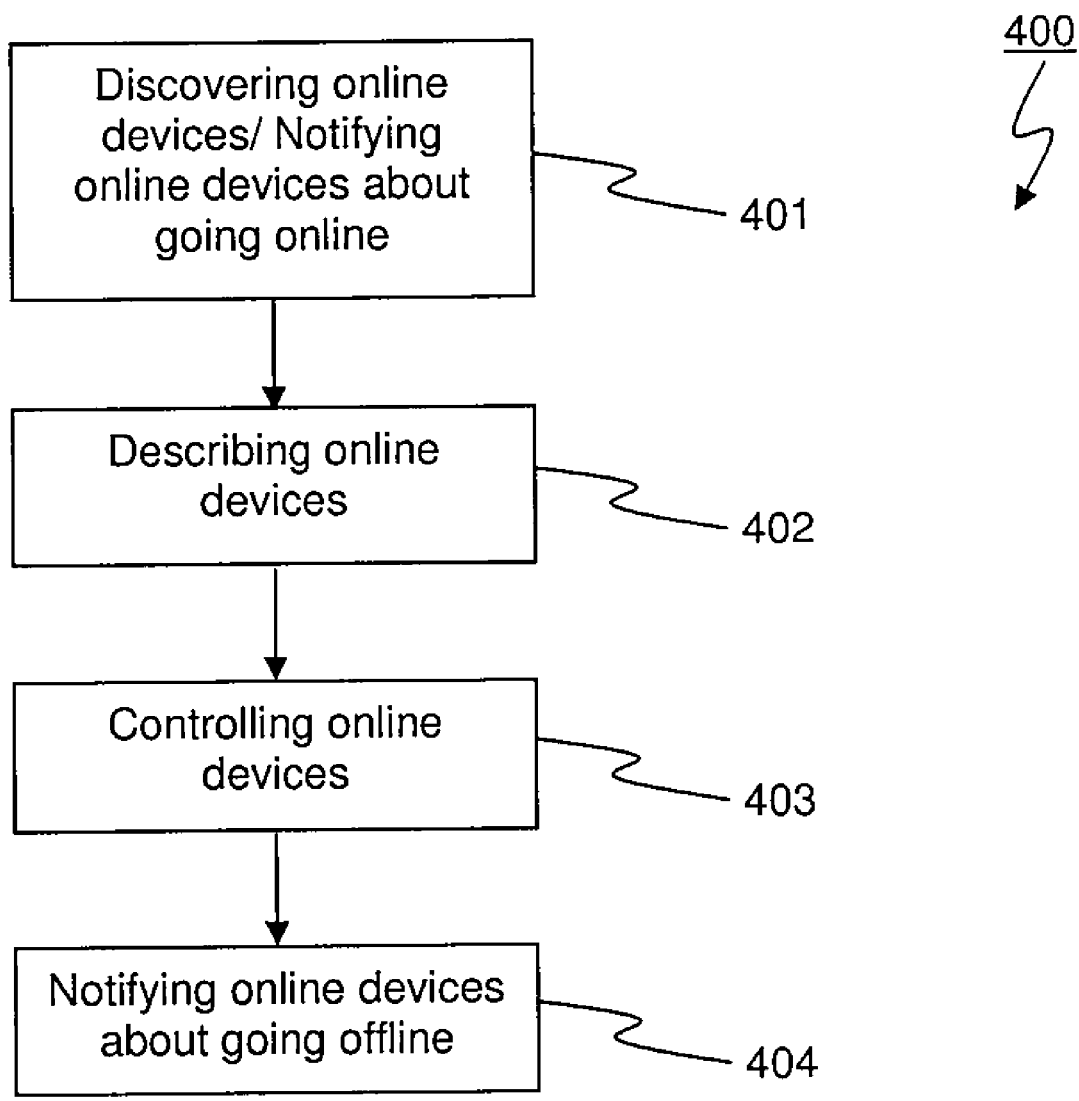
FIG. 4 depicts a flow diagram of concurrent IGRS-UPnP device operation according to the claimed invention.

FIG. 4 depicts a flow diagram 400 of concurrent IGRS-UPnP device operation according to the claimed invention. In online step 401, according to one embodiment of the claimed invention, the concurrent IGRS-UPnP device discovers other online devices in a network having IGRS devices and UPnP devices; according to another embodiment of the claimed invention, the concurrent IGRS-UPnP device notifies some or all of the online devices in the network that the concurrent IGRS-UPnP device is going online.

According to one embodiment of the claimed invention, the online step 401 includes composing interoperable messages that contains a portion of content compatible only with the IGRS protocol, a portion of content compatible only with the UPnP protocol, and a portion of content compatible with both the IGRS and the UPnP protocols such that the whole message is interoperable among the network of IGRS device and UPnP device. The concurrent IGRS-UPnP device may then either broadcast or transmit such message to other devices in the network.

According to an embodiment of the claimed invention, the concurrent IGRS-UPnP device takes initiative to broadcast interoperable messages for discovering other devices in the network. According to another embodiment of the claimed invention, the concurrent IGRS-UPnP device composes and broadcasts interoperable messages for notifying other devices in the network about going online.

In describing step 402, the concurrent IGRS-UPnP device describes those online devices that were found in discovering step 401. In controlling step 403, the concurrent IGRS-UPnP device controls some or all of the online devices. According to an embodiment of the claimed invention, the concurrent IGRS-UPnP device composes and transmits the interoperable messages as described above in a one-to-one manner in the controlling step 403.

In notifying step 404, the concurrent IGRS-UPnP device notify some or all of the online devices in the network that the concurrent IGRS-UPnP device is going offline. According to an embodiment of the claimed invention, the concurrent IGRS-UPnP device composes and broadcasts the interoperable messages as described above in the notifying step 404.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

We claim:

1. A method of concurrent IGRS-UPnP device operation for network having at least one IGRS device or at least one UPnP device or both, comprising:
    composing at least one message, said message including:
        a first portion of content compatible only with the IGRS protocol;
        a second portion of content compatible only with the UPnP protocol; and
        a third portion of content compatible with both the IGRS and the UPnP protocols; and
    broadcasting said message to other devices in the network;
    wherein said message being interoperable among said network of IGRS device and UPnP device;
    wherein the composing of message and the broadcasting of message are performed by a control point device, comprising:
        a port layer, comprising a first port and a second port;
        an application layer, comprising a mini-server, a multicast listener, and a HTTP sender;
        a profile handler session layer, comprising an UPnP profile handler and an IGRS profile handler;
        a device handler session layer, comprising an advertisement handler, an event handler, a description handler, a discovery handler, and an IGRS Pipe/Session Manager; and a transport layer, comprising a core library operable to handle protocols selected from the group consisting of HTTP, XML, SSDP, GENA, SOAP, and WSDL.

2. The method of concurrent IGRS-UPnP device operation according to claim 1, further comprising:
discovering online devices;
describing online devices;
controlling online devices; and
notifying online devices that a given device is going offline;
wherein said broadcasting is performed at least in said discovering of online devices, said controlling of online devices, and said notifying of online devices that a given device is going offline.

3. The method of concurrent IGRS-UPnP device operation according to claim 2 wherein said discovering of online devices additionally comprises an Alive Notification step.

4. The method of concurrent IGRS-UPnP device operation according to claim 2 wherein said discovering of online devices additionally comprises the step of taking initiative to broadcast message for discovering other devices in said network.

5. The method of concurrent IGRS-UPnP device operation according to claim 2 wherein said describing of online devices additionally comprises a Pipe Setup step.

6. The method of concurrent IGRS-UPnP device operation according to claim 5 wherein said describing of online devices additionally comprises a Pipe Disconnection step.

7. The method of concurrent IGRS-UPnP device operation according to claim 2 wherein said describing of online devices additionally comprises an IGRS Device Description step.

8. The method of concurrent IGRS-UPnP device operation according to claim 7 wherein said describing of online devices additionally comprises an IGRS Service Description step.

9. The method of concurrent IGRS-UPnP device operation according to claim 2 wherein said controlling of online devices additionally comprises a Pipe Setup step.

10. The method of concurrent IGRS-UPnP device operation according to claim 9 wherein said controlling of online devices additionally comprises a Session Setup step.

11. The method of concurrent IGRS-UPnP device operation according to claim 10 wherein said controlling of online devices additionally comprises an Action Control step for controlling the actions of IGRS devices, UPnP devices or both type of devices in the network.

12. The method of concurrent IGRS-UPnP device operation according to claim 10 wherein said controlling of online devices additionally comprises a Session Termination step.

13. The method of concurrent IGRS-UPnP device operation according to claim 9 wherein said controlling of online devices additionally comprises a Pipe Disconnection step.

14. The method of concurrent IGRS-UPnP device operation according to claim 2 wherein said notifying of online devices additionally comprises an Offline Notification step.

15. The method of concurrent IGRS-UPnP device operation according to claim 2 wherein said controlling of online devices commands direct data transfer between said IGRS device and said UPnP device.

16. A concurrent IGRS-UPnP device for a network having at least one IGRS device or at least one UPnP device or both, comprising:

a processing unit for composing at least one message including:
a first portion of content compatible only with the IGRS protocol;
a second portion of content compatible only with the UPnP protocol; and
a third portion of content compatible with both the IGRS and the UPnP protocols;
wherein the whole message being interoperable among said network of IGRS device and UPnP device;
a memory unit for storing said message; and
a network interface unit;
wherein the network interface unit including:
a port layer, comprising a first port and a second port;
an application layer, comprising a mini-server, a multicast listener, and a HTTP sender;
a profile handler session layer, comprising an UPnP profile handler and an IGRS profile handler;
a device handler session layer, comprising an advertisement handler, an event handler, a description handler, a discovery handler, and an IGRS Pipe/Session Manager; and
a transport layer, comprising a core library operable to handle protocols selected from the group consisting of HTTP, XML, SSDP, GENA, SOAP, and WSDL.

17. The concurrent IGRS-UPnP device according to claim 16, comprising additionally at least one user interface unit.

18. A concurrent IGRS-UPnP system, comprising:
at least one IGRS device;
at least one UPnP device;
a control point device operable to broadcast at least one message to said IGRS and UPnP device, said message including:
a first portion of content compatible only with the IGRS protocol;
a second portion of content compatible only with the UPnP protocol; and
a third portion of content compatible with both the IGRS and the UPnP protocols;
wherein the whole message being interoperable among said IGRS device and UPnP device;
wherein the control point device including:
a port layer, comprising a first port and a second port;
an application layer, comprising a mini-server, a multicast listener, and a HTTP sender;
a profile handler session layer, comprising an UPnP profile handler and an IGRS profile handler;
a device handler session layer, comprising an advertisement handler, an event handler, a description handler, a discovery handler, and an IGRS Pipe/Session Manager; and
a transport layer, comprising a core library operable to handle protocols selected from the group consisting of HTTP, XML, SSDP, GENA, SOAP, and WSDL.

19. The concurrent IGRS-UPnP system according to claim 18, wherein said control point device is additionally operable to send or receive messages from said IGRS device and said UPnP device.

20. The concurrent IGRS-UPnP system according to claim 19, wherein said control point device is additionally operable to command direct data transfer between said IGRS device and said UPnP device.

* * * * *